(12) United States Patent
Vieira et al.

(10) Patent No.: US 11,979,199 B2
(45) Date of Patent: May 7, 2024

(54) ASSIGNMENT OF TRANSCEIVER ANTENNA ELEMENTS FOR CHANNEL SENSING

(71) Applicant: Telefonaktiebolaget LM Ericsson (publ), Stockholm (SE)

(72) Inventors: Joao Vieira, Hjärup (SE); Narendar Madhavan, Bara (SE); Leif Wilhelmsson, Lund (SE); Tai Do, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 17/613,207

(22) PCT Filed: May 29, 2019

(86) PCT No.: PCT/EP2019/064019
§ 371 (c)(1),
(2) Date: Nov. 22, 2021

(87) PCT Pub. No.: WO2020/239217
PCT Pub. Date: Dec. 3, 2020

(65) Prior Publication Data
US 2022/0224425 A1 Jul. 14, 2022

(51) Int. Cl.
*H04B 17/309* (2015.01)
(52) U.S. Cl.
CPC .................. *H04B 17/309* (2015.01)
(58) Field of Classification Search
None
See application file for complete search history.

(56) References Cited

U.S. PATENT DOCUMENTS

2008/0117865 A1   5/2008  Li et al.
2009/0021434 A1*  1/2009  Lee ................. H01Q 21/00
                                        343/893

(Continued)

OTHER PUBLICATIONS

Panasonic, "DL signals and channels for NR-U", 3GPP TSG-RAN WG1 #97, May 13-17, 2019, pp. 1-6, Reno, US, R1-1907033.

(Continued)

*Primary Examiner* — Gennadiy Tsvey
(74) *Attorney, Agent, or Firm* — COATS & BENNETT, PLLC

(57) ABSTRACT

A method is disclosed for a wireless transceiver comprising a plurality of transceiver antenna elements and configured to operate in a communication network. The method comprises dynamically assigning (from the plurality of transceiver antenna elements) a first set of transceiver antenna elements allocated for channel sensing and a second set of transceiver antenna elements allocated for communication, performing channel sensing using the first set of transceiver antenna elements, and operating the wireless transceiver based on a result of the performed channel sensing. For example, dynamically assigning the first and second sets of transceiver antenna elements may comprise (in a non-communication mode of the wireless transceiver) letting the first set comprise all of the transceiver antenna elements and letting the second set be empty, (in a communication transmission mode of the wireless transceiver) letting the first set comprise a first subset of the transceiver antenna elements and letting the second set comprise a second subset of the transceiver antenna elements, wherein the first and second subsets are nonoverlapping, and (in a communication reception mode of the wireless transceiver) letting the first set comprise a third subset of the transceiver antenna elements and letting the second set comprise a fourth subset of the transceiver antenna elements, wherein the third and fourth (Continued)

subsets are non-overlapping or overlapping. Corresponding apparatus, wireless transceiver, access node, user device and computer program product are also disclosed.

15 Claims, 5 Drawing Sheets

(56) References Cited

U.S. PATENT DOCUMENTS

| | | | |
|---|---|---|---|
| 2009/0198754 A1* | 8/2009 | Chang | H03H 21/0012 |
| | | | 708/319 |
| 2011/0130101 A1* | 6/2011 | Jung | H04W 16/14 |
| | | | 455/226.1 |
| 2016/0192395 A1 | 6/2016 | Yoo et al. | |
| 2017/0118774 A1* | 4/2017 | Cariou | H04W 74/0816 |
| 2018/0199342 A1* | 7/2018 | Rai | H04K 3/226 |
| 2018/0317244 A1* | 11/2018 | Um | H04W 72/1215 |
| 2019/0104546 A1 | 4/2019 | Chendamarai Kannan et al. | |
| 2020/0059284 A1* | 2/2020 | Abouelseoud | H04W 40/244 |

OTHER PUBLICATIONS

Huawei et al., "Coexistence and channel access for NR unlicensed band operations", 3GPP TSG RAN WG1 Meeting #97, May 13-17, 2019, pp. 1-21, Reno, US, R1-1906044.

LG Electronics, "Channel access procedure for NR-U", 3GPP TSG RAN WG1 Meeting #97, May 13-17, 2019, pp. 1-14, Reno, US, R1-1906675.

\* cited by examiner

ASSIGNMENT OF TRANSCEIVER ANTENNA ELEMENTS FOR CHANNEL SENSING

TECHNICAL FIELD

The present disclosure relates generally to the field of wireless communication. More particularly, it relates to channel sensing in wireless communication.

BACKGROUND

For a communication node (e.g., an access node such as an access point, AP, or a base station, a gNB for example; or a user device such as a user station, STA, or a user equipment, UE) to be allowed to transmit in unlicensed spectrum, it is typically required that the communication node performs a successful clear channel assessment (CCA) procedure (also known as a Listen Before Talk (LBT) procedure) before transmission. To claim this procedure to be successful, it is typically required to sense the medium to be unoccupied (e.g., idle) for a number of time intervals.

After sensing the medium to be unoccupied, a communication node is typically allowed to transmit in a burst-like fashion for a maximum amount of time; sometimes referred to as the MCOT (Maximum Channel Occupancy Time). The length of the MCOT may, for example, depend on regulations applicable in the unlicensed spectrum and on the type of LBT that has been performed. The length of the MCOT may typically range from 1 ms to 10 ms.

In some scenarios relating to application of MCOT, a gNB can share its channel occupancy (after successfully completing a long LBT procedure) with uplink transmissions from one or more UEs; e.g., may schedule UEs to transmit during the MCOT. One goal with introduction of such a concept of sharing the MCOT is to decrease (e.g., minimize) the need for UEs to perform long LBT procedures prior to transmissions in the uplink. A UE may, when scheduled accordingly, be required to perform a short LBT procedure immediately following a downlink transmission from the gNB.

To exemplify the concept of long/short LBT procedure, reference is made to Third Generation Partnership Project (3GPP) technical report TR 36.889, v13.0.0 (see, e.g., section 8.2), where four LBT categories (Categories 1-4) are used. When a long LBT procedure is referred to herein, it may refer to an LBT procedure with random backoff and Category 3 and Category 4 are examples thereof. When a short LBT procedure is referred to herein, Category 2 is one example thereof. Other standardization specifications also deal with the concept of LBT. In general, long or short LBT denotes the time spent to take to access the channel in a fair manner. And in general, Short LBT may be used for high priority traffic that are not too frequent or not that long in duration, and long LBT may be used for background or low priority traffic. High-priority traffic thus has a higher chance of being sent than low-priority traffic.

For these and/or other reasons, there is a need for proper channel sensing approaches.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a wireless transceiver comprising a plurality of transceiver antenna elements and configured to operate in a communication network.

The method comprises dynamically assigning, from the plurality of transceiver antenna elements, a first set of transceiver antenna elements allocated for channel sensing and a second set of transceiver antenna elements allocated for communication.

The method also comprises performing channel sensing using the first set of transceiver antenna elements, and operating the wireless transceiver based on a result of the performed channel sensing.

In some embodiments, a transceiver antenna element of the plurality is configured to dynamically switch between transmission operation and reception operation.

In some embodiments, a transceiver antenna element of the plurality is configured to dynamically switch between communication operation and sensing operation.

In some embodiments, a selection of which transceiver antenna elements belongs to the first and second sets is variable.

In some embodiments, cardinalities of the first and second sets are variable.

In some embodiments, the cardinality of the second set is variable between zero and the plurality, and can take at least two values which differ from zero and the plurality.

In some embodiments, the cardinality of the first set is variable between one and the plurality, and can take at least one value which differs from the plurality.

In some embodiments, dynamically assigning the first and second sets of transceiver antenna elements comprises determining cardinalities of the first and second sets based on one or more of: a communication mode of the wireless transceiver, network statistics collected by the wireless transceiver, network statistics collected by one or more other wireless transceivers, one or more previous results of channel sensing performed by the wireless transceiver, and one or more previous results of channel sensing performed by one or more other wireless transceivers.

In some embodiments, dynamically assigning the first and second sets of transceiver antenna elements comprises (in a non-communication mode of the wireless transceiver) letting the first set comprise all of the transceiver antenna elements and letting the second set be empty, and/or (in a communication transmission mode of the wireless transceiver) letting the first set comprise a first subset of the transceiver antenna elements and letting the second set comprise a second subset of the transceiver antenna elements, wherein the first and second subsets are non-overlapping, and/or (in a communication reception mode of the wireless transceiver) letting the first set comprise a third subset of the transceiver antenna elements and letting the second set comprise a fourth subset of the transceiver antenna elements, wherein the third and fourth subsets are non-overlapping or overlapping.

In some embodiments, a size of the first subset is determined based on one or more previous results of channel sensing performed by the wireless transceiver and/or by one or more other wireless transceivers.

In some embodiments, the channel sensing is performed while communication is performed using the second set of transceiver antenna elements in communication transmission and/or reception modes of the wireless transceiver.

In some embodiments, the channel sensing comprises omnidirectional channel sensing and/or directional channel sensing.

In some embodiments, the channel sensing is performed periodically in time and/or is performed in response to a channel sensing triggering event.

In some embodiments, operating the wireless transceiver based on the result of the performed channel sensing comprises (when the performed channel sensing detects an interfering signal in communication transmission mode of the wireless transceiver) determining to continue an ongoing transmission when the interfering signal is detected to originate from the communication network of the wireless transceiver and an attempt to decode the interfering signal succeeds, determining to stop the ongoing transmission when the interfering signal is determined to originate from the communication network of the wireless transceiver and an attempt to decode the interfering signal fails, and determining to stop the ongoing transmission when the interfering signal is detected to originate from a different communication network.

In some embodiments, wherein the channel sensing is directional channel sensing performed in one direction, operating the wireless transceiver based on the result of the performed channel sensing comprises (in communication transmission and/or reception modes of the wireless transceiver) selecting whether or not to use the direction for an upcoming transmission or reception opportunity based on signal detection for the direction during the channel sensing.

In some embodiments, wherein the channel sensing is directional channel sensing performed in two or more directions, operating the wireless transceiver based on the result of the performed channel sensing comprises (in communication transmission and/or reception modes of the wireless transceiver) selecting one or more direction of the two or more directions for an upcoming transmission or reception opportunity, wherein the channel sensing of the selected one or more direction detected less interference or lower received signal strength than the channel sensing of at least one of the non-selected directions.

In some embodiments, operating the wireless transceiver based on the result of the performed channel sensing comprises transmitting a channel sensing report including the result to one or more other wireless transceivers and/or to a channel sensing statistics server.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a wireless transceiver comprising a plurality of transceiver antenna elements and configured to operate in a communication network.

The apparatus comprises controlling circuitry configured to cause dynamic assignment (from the plurality of transceiver antenna elements) of a first set of transceiver antenna elements allocated for channel sensing and a second set of transceiver antenna elements allocated for communication.

The controlling circuitry is also configured to cause performance of channel sensing using the first set of transceiver antenna elements, and operation of the wireless transceiver based on a result of the performed channel sensing.

A fourth aspect is a wireless transceiver comprising the apparatus of the third aspect.

A fifth aspect is an access node comprising one or more of the apparatus of the third aspect and the wireless transceiver of the fourth aspect.

A sixth aspect is a user device comprising one or more of the apparatus of the third aspect and the wireless transceiver of the fourth aspect.

In some embodiments, any of the above aspects may additionally have features identical with or corresponding to any of the various features as explained above for any of the other aspects.

An advantage of some embodiments is that alternative channel sensing approaches are provided.

Another advantage of some embodiments is that flexible channel sensing approaches are provided. Thereby, in some embodiments, sensing can be achieved when needed (even during communication—reception or transmission—by the sensing node) while transceiver antenna elements are not tied up for sensing when not needed.

Yet an advantage of some embodiments is that channel sensing may be improved (e.g., by obtaining a trade-off between benefits of omnidirectional and directional sensing).

A further advantage of some embodiments is that the channel sensing approach entails no, or negligible, signaling overhead.

Yet an advantage of some embodiments is that a communication network operating with one or more wireless transceivers according to embodiments presented herein yields higher resilience and/or robustness in the presence of transceiver nodes capable of beamformed transmissions (compared to prior art solutions).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
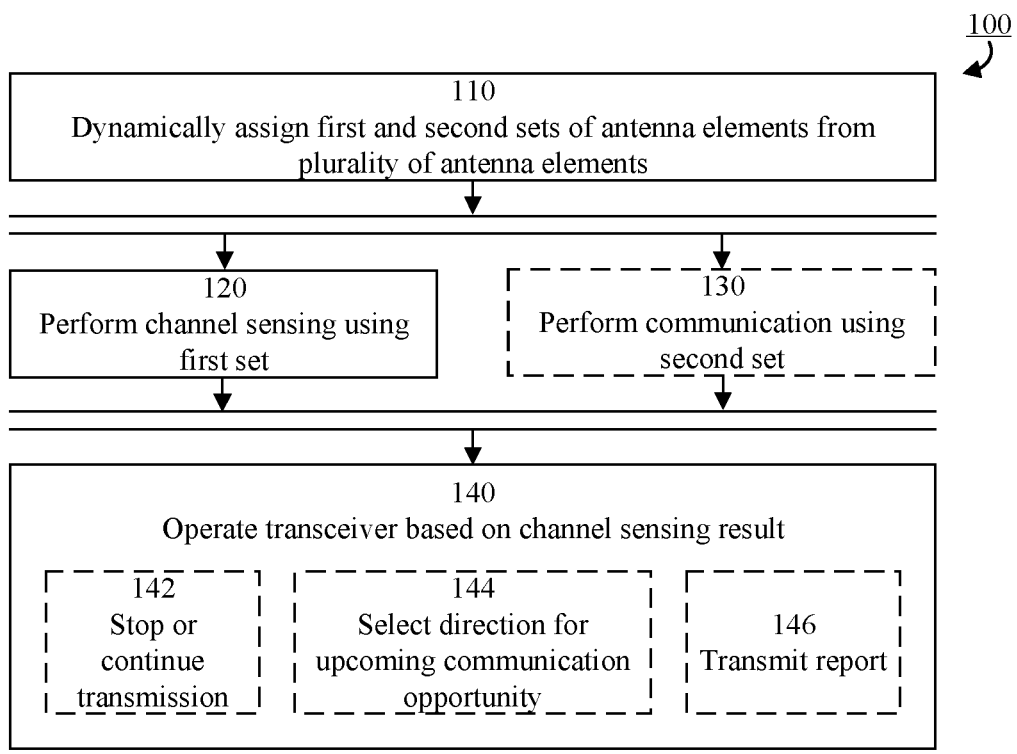
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when detection of interference is referred to herein, it may encompass any un-wanted signal detection (e.g., detection of one or more signals not intended for the wireless transceiver performing the detection).

To exemplify one scenario where embodiments may be beneficial, a problem experienced when using unlicensed spectrum will now be described.

The evolution of wireless communication systems, e.g., the concept of new radio (NR), points towards designs that heavily rely on spatial beamforming. Therefore, transceiver nodes, such as gNBs, are typically equipped with many antennas (a.k.a. antenna elements, often arranged in an antenna array).

In the context of operation in unlicensed spectrum, beamforming achievable by the many antennas may provide possibilities to enhance link quality (e.g., via array gain) and/or possibilities to increase the spatial reuse. However, a challenge when using beamforming for communication in the context of operation in unlicensed spectrum is that the risk of collision between transmissions from two or more nodes may increase.

For omni-directional (i.e., non-beamformed) transmissions, it is likely that all relevant nodes detects ongoing transmission(s) during their LBT procedure since the transmitted power is radiated in every direction and not only steered in the direction(s) towards the intended receiver(s). For beamformed transmissions, it is typically less likely that all relevant nodes detect ongoing transmission(s) during their LBT procedure; especially for nodes in different directions than the intended receiver(s).

A node that does not detect ongoing transmissions during its LBT procedure may subsequently start transmitting, which may cause interference problems (e.g., for the receiver(s) of the ongoing transmission(s), inter-cell interference, and/or intra-cell interference). Such a situation may also lead to less power efficient operation at the node itself and/or at other nodes and/or to high latency, since collisions typically result in retransmissions.

When communication of a first node uses beamforming, it may seem beneficial to use beamformed sensing (a.k.a., directional sensing) for the first node, for example, since it may seem that it is only relevant that the channel is unoccupied in the direction of the intended transmission of the first node. However, as implicated above such an approach may lead to increased collision risk.

On the other hand, omni-directional sensing may not be able to cover as large distances as directional sensing, and may potentially not provide the large degree of spatial reuse that beamformed transmissions can offer.

For operation in unlicensed spectrum, omni-directional LBT procedures are typically performed before transmission.

There are techniques to enable directional (e.g., beamformed) transmissions: quasi-omni-directional LBT, and directional LBT.

For example, IEEE 802.11ad/ay systems perform LBT with energy detection (ED) considering no array gain, which is called quasi-omni-directional LBT. A quasi-omni directional LBT is an LBT performed using a quasi-omni-directional antenna pattern (an operating mode of a directional multiple antenna system, which has the widest beam width attainable).

Another example is LBT with energy detection via a narrow beam; which is called directional LBT. This approach typically improves the probability of successful channel access and enhances spatial reuse by focusing on performing directional transmissions. Such an approach may typically involve selecting a direction to transmit by performing LBT in various directions with a configured energy detection threshold in the specific direction, and determining if the channel is busy or idle in that specific direction.

While omni-directional LBT and quasi-omni-directional LBT have the drawback that they could cause lower than desired spatial reuse, directional LBT has the drawback that it could cause interference problems as implicated above.

There are some approaches for mitigation of the interference problems for directional LBT. However, these typically involve some form of receiver assistance (e.g., Ready-to-send/Clear-to-send, RTS/CTS, signaling) for confirming the channel access state at both transmitter and receiver.

Thus, omni-directional LBT and quasi-omni-directional LBT, although enabling directional transmissions, may lead to an overprotected situation with lower than possible spatial reuse. For example, one strong signal sensed from one direction could block the whole channel and prevent transmissions in all other directions even if the prevented transmissions would not interfere with the strong signal.

On the other hand, directional LBT may lead to the interference problems exemplified above due to the limited sensing. Moreover, directional LBT needs to cover at least one direction per transmission. Furthermore, the overhead caused by directional LBT could be increased compared with omni-directional LBT or quasi-omnidirectional LBT.

Approaches for mitigation of the interference problems for directional LBT are typically based on handshaking procedures and/or channel reservation messages. These approaches may cause signaling overhead for each transmission. Moreover, they are typically originally designed for single antenna nodes and do not exploit the additional spatial degrees of freedom offered by antenna arrays. Another drawback is that the channel may be free during the handshaking procedure, while busy when the actual data needs to be transmitted.

In the following, embodiments will be described where various channel sensing approaches are applied.

FIG. 1 illustrates an example method 100 according to some embodiments. The method is for a wireless transceiver (e.g., comprised, or comprisable, in an access node or a user device) comprising a plurality of transceiver antenna elements and configured to operate in a communication network.

Generally, the plurality of transceiver antenna elements may be any suitable collection of two, three, four, five, six, seven, eight, or more transceiver antenna elements; typically a collection of a relatively large number (e.g., 10 or more, 20 or more, 50 or more, 100 or more, etc.) of transceiver antenna elements.

The communication network may typically provide a communication environment requiring channel sensing before transmission. Typically, the communication network may operate in an unlicensed frequency band.

Generally, channel sensing may comprise any suitable approach, for example, one or more of: listen-before-talk (LBT), clear channel assessment (CCA), and carrier sense multiple access with collision avoidance (CSMA/CA).

For example, the plurality of transceiver elements may be organized in a multi-antenna structure, such as an antenna array or an antenna matrix.

Figure 2:
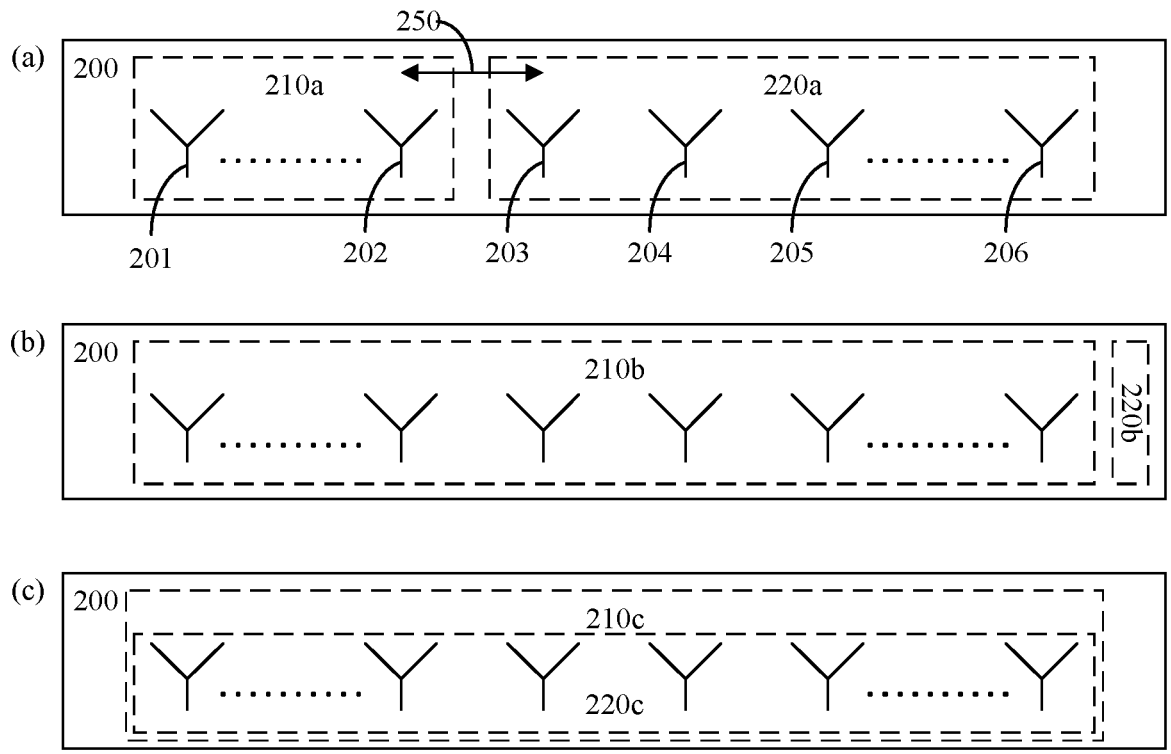
FIG. 2 is a schematic drawing illustrating example assignment of transceiver antenna elements according to some embodiments.

FIG. 2 schematically illustrates an example antenna array 200 comprising a plurality of antenna elements 201, 202, 203, 204, 205, 206 in relation to three example assignment scenarios that will be elaborated on later herein.

Returning to FIG. 1, the method 100 comprises dynamically assigning, from the plurality of transceiver antenna elements, a first set of transceiver antenna elements allocated for channel sensing and a second set of transceiver antenna elements allocated for communication, as illustrated in step 110.

Typically, channel sensing using the first set of transceiver antenna elements can be (partly or fully) simultaneous to communication using the second set of transceiver antenna element.

Communication may, for example, comprises communication of payload data, control data, or any other information carrying data. Furthermore, communication may comprise transmission and/or reception.

Assigning the first and second sets of transceiver antenna elements may, for example, comprise partitioning the plurality of transceiver antenna elements into two non-overlapping groups of transceiver antenna elements. The two non-overlapping groups may together comprise all transceiver antenna elements in the plurality of transceiver antenna elements, or may together comprise a subset of the transceiver antenna elements in the plurality of transceiver antenna elements.

Assigning the first and second sets of transceiver antenna elements may, alternatively or additionally, comprise partitioning the plurality of transceiver antenna elements into two overlapping groups of transceiver antenna elements. The two overlapping groups may together comprise all transceiver antenna elements in the plurality of transceiver antenna elements, or may together comprise a subset of the transceiver antenna elements in the plurality of transceiver antenna elements.

In some embodiments, at least one transceiver antenna element of the plurality of transceiver antenna elements is configured to dynamically switch between transmission operation and reception operation, thereby enabling dynamic assignment. For example, a subset, or all, of the transceiver antenna elements of the plurality of transceiver antenna elements may be configured to dynamically switch between transmission operation and reception operation. Thus, each antenna element of the plurality of transceiver antenna elements may be configured to dynamically switch between transmission operation and reception operation according to some embodiments.

Alternatively or additionally, in some embodiments, at least one transceiver antenna element of the plurality of transceiver antenna elements is configured to dynamically switch between communication operation and sensing operation, thereby enabling dynamic assignment. For example, a subset, or all, of the transceiver antenna elements of the plurality of transceiver antenna elements may be configured to dynamically switch between communication operation and sensing operation. Thus, each antenna element of the plurality of transceiver antenna elements may be configured to dynamically switch between communication operation and sensing operation according to some embodiments.

The dynamic assignment of step 110 may comprise that cardinalities of the first and second sets are variable. Thus, the first set may have a first cardinality in a first assignment and a second cardinality in a second assignment, wherein the first and second cardinalities are different or the same; and correspondingly for the second set.

The cardinality of the second set may, according to some embodiments, be variable between zero and the plurality, wherein it can take at least two (e.g., two, three, four, or more) values which differ from zero and the plurality. Thus, there is at least one possible second set not comprising exactly half of the plurality of transceiver antenna elements according to these embodiments. In one example, the second set may be able to have all possible cardinalities between (and including) zero and the plurality. In another example, the second set may be able to have all possible cardinalities between (but excluding at least one of) zero and the plurality.

The cardinality of the first set may have similar properties as described above for the cardinality of the second set. Alternatively, the cardinality of the first set may, according to some embodiments, be variable between one and the plurality, wherein it can take at least one (e.g., one, two, three, four, or more) value which differs from the plurality. Thus, there is at least one possible first set not comprising the whole plurality of transceiver antenna elements according to these embodiments. In some of these embodiments, there is further at least one possible first set not comprising exactly half of the plurality of transceiver antenna elements. In one example, the first set may be able to have all possible cardinalities between (and including) one and the plurality. In another example, the first set may be able to have all possible cardinalities between (but excluding at least one of) one and the plurality.

Additionally or alternatively to cardinalities of the first and second sets being variable, the dynamic assignment of step 110 may comprise that it is variable which transceiver antenna elements belongs to the first and second sets. For example, even if the first set of two different assignments has the same cardinality, one or more of the transceiver antenna elements of the first set of one of the assignments may differ from the transceiver antenna elements of the first set of the other one of the assignments, and vice versa. Similarly, even if the second set of two different assignments has the same cardinality, one or more of the transceiver antenna elements of the second set of one of the assignments may differ from the transceiver antenna elements of the second set of the other one of the assignments, and vice versa. Varying which transceiver antenna elements belongs to the first and second sets may, for example, improve coverage of the sensing.

In some embodiments, dynamically assigning the first and second sets of transceiver antenna elements in step 110 comprises determining cardinalities of the first and second sets and/or which transceiver antenna elements belongs to the first and second sets based on one or more of: a communication mode of the wireless transceiver, network statistics collected by the wireless transceiver, network statistics collected by one or more other wireless transceivers one or more previous results of channel sensing performed by the wireless transceiver, and one or more previous results of channel sensing performed by one or more other wireless transceivers.

For example, if the last K channel sensing operations resulted in a ratio between signal detections and clear channel detections which exceeds some threshold value, the number of antenna elements allocated for channel sensing may be increased (and/or the channel sensing may be performed more often).

Network statistics may, for example, relate to acknowledgement signaling: a number of acknowledgments (#ACK), a number of negative acknowledgments (#NACK), and/or an acknowledgement rate #ACK/(#ACK+#NACK)—possibly during a specified duration of time (e.g., last p seconds). Alternatively or additionally, network statistics may, for example, relate to an error rate (e.g., a packet error rate, PER, a block error rate, BLER, a bit error rate, BER, etc.). Acknowledgement signaling and/or error rates for the network statistics may relate to the wireless transceiver collecting the statistics, and/or may relate to other wireless transceivers (e.g., the entire network).

For example, when the acknowledgement rate is above a first threshold value, the number of antenna elements allocated for channel sensing may be decreased and the number of antenna elements allocated for communication may be increased; while the number of antenna elements allocated for channel sensing may be increased and the number of antenna elements allocated for communication may be decreased when the acknowledgement rate is below a second threshold value. The number of antenna elements allocated for channel sensing and the number of antenna elements allocated for communication may be kept unchanged when the acknowledgement rate is below the first threshold value and above the second threshold value.

Alternatively or additionally, the acknowledgement rate may be contrasted against a table that implements a mapping between the acknowledgement rate and the number of antenna elements allocated for channel sensing and communication, respectively. The table may, for example, be built using artificial intelligence algorithms based on, e.g., information on how well the communication network and/or the wireless transceiver has operated previously (e.g., in terms of throughput) for different acknowledgement rates.

Example operation modes may comprise one or more of a non-communication mode (e.g., an idle mode or similar), a transmission communication mode (also termed communication transmission mode herein), and a reception communication mode (also termed communication reception mode herein). In some embodiments, dynamically assigning the first and second sets of transceiver antenna elements comprises assignment based on one or more of the wireless transceiver being in non-communication mode, transmission communication mode, and reception communication mode.

In a non-communication mode of the wireless transceiver, dynamic assignment may comprise letting the first set comprise all of the transceiver antenna elements and letting the second set be empty. Thus, all antenna elements are allocated for channel sensing (e.g., LBT) in this scenario.

In a communication transmission mode of the wireless transceiver, dynamic assignment may comprise letting the first set comprise a first subset of the transceiver antenna elements and letting the second set comprise a second subset of the transceiver antenna elements, wherein the first and second subsets are non-overlapping. Possibly, but not necessarily, the first and second subsets may together comprise all of the transceiver antenna elements of the plurality.

In a communication reception mode of the wireless transceiver, dynamic assignment may comprise letting the first set comprise a third subset of the transceiver antenna elements and letting the second set comprise a fourth subset of the transceiver antenna elements, wherein the third and fourth subsets are non-overlapping or (partially or fully) overlapping. Overlap of the third and fourth subsets may imply joint communication and sensing. Possibly, but not necessarily, the third and fourth subsets may together comprise all of the transceiver antenna elements of the plurality.

In communication transmission mode and/or in communication reception mode the size of the first and/or second subset may be determined based on one or more previous results of channel sensing performed by the wireless transceiver and/or by one or more other wireless transceivers.

After dynamic assignment in step 110, the method 100 comprises performing channel sensing using the first set of transceiver antenna elements, as illustrated in step 120. The channel sensing may comprise any suitable channel sensing approach, such as those used in, for example, LBT, CCA, or CSMA/CA.

In various embodiments, the channel sensing may be performed periodically (e.g., with the periodicity depending on sensing results and/or statistics of previous sensing results by the wireless transceiver and/or by one or more other wireless transceivers) in time and/or may be performed aperiodically, e.g., in response to a channel sensing triggering event (e.g., detection of a problematic scenario in terms of channel access). For example, a period for periodically performed channel sensing may be relatively long when sensing results indicate that successful channel sensing (i.e., channel access) is likely, while it may be relatively short when sensing results indicate that successful channel sensing is not so likely. For example, a problematic scenario in terms of channel access may related to high, or otherwise problematic, interference. Detection of a problematic scenario may, for example, be achieved by detection of one or more of: a relatively low received signal strength indicator (RSSI), a relatively low signal-to-interference ratio (SIR), a relatively high bit error rate (BER), a relatively high block error rate (BLER), detection of a high ratio between negative acknowledgement (NACK) and acknowledgement (ACK), or similar.

In an example of periodic channel sensing, an ongoing downlink (DL) or uplink (UL) communication takes place across several consecutive orthogonal frequency division multiplexing (OFDM) symbols and the wireless transceiver is an access node or a user device configured to activate the sensing antenna elements in a certain pre-defined number of OFDM symbols in a slot/frame (e.g., in symbol 0 and 6 of each slot). Generally, the sensing antenna elements can be activated periodically across the slot/frame with periodicity ρ OFDM symbols and a sensing length of n OFDM symbols, wherein ρ=2/14 and n=1 results in sensing in symbol 0 and 6 of each slot.

Depending on the network conditions, the communication network (or the wireless transceiver) may dynamically change the values of p and/or n so that more or less sensing is performed.

Thus, the periodicity ρ and/or the sensing length of n may be variable. For instance, if RSSI of the interference experienced at the wireless transceiver is higher than a threshold value during a period of time, the network can decide to decrease the periodicity ρ and/or increase the sensing length n. Alternatively or additionally, if the number of NACK over a period of time is higher than a threshold value, the network can decide to decrease the periodicity ρ and/or increase the sensing length n. In a communication network with more than one user device, the NACK counter can be based on feedback of a subset, or all, of the user devices.

Furthermore, the communication network (or the wireless transceiver) may assign different sensing instances across a slot to different transceivers, which typically increases the probability of detecting problematic situations such as the hidden node problem.

In an example of aperiodic channel sensing, the sensing mode is only activated when needed to increase network efficiency. For instance, the sensing mode can be triggered based on received signal strength indicator (RSSI) measurements; if RSSI of the interference experienced at the wireless transceiver is higher than a threshold value during a period of time, the network can decide to activate the sensing mode. Alternatively or additionally, the sensing mode can be triggered based on ACK/NACK history; if the number of NACK over a period of time is higher than a threshold value, the network can decide to activate the sensing mode. In a communication network with more than one user device, the NACK counter can be based on feedback of one, a subset, or all, of the user devices.

The channel sensing may comprise omnidirectional channel sensing and/or directional channel sensing according to various embodiments. The dynamic assignment of transceiver antenna elements of the first set may support omnidirectional and/or directional channel sensing. For example, the larger the cardinality of the first set, the narrower beam is possible for directional channel sensing (omnidirectional sensing typically requires only one transceiver antenna element being part of the first set).

In some embodiments or scenarios, as illustrated by optional step 130, the channel sensing of step 120 is performed while (e.g., partly or fully simultaneously as) communication is performed using the second set of transceiver antenna elements in communication transmission and/or reception modes of the wireless transceiver. As mentioned before, communication may comprise transmission and/or reception of payload data, control data, or any other information carrying data, for example.

When performing channel sensing in communication transmission mode, part of the transmitted signal may be received in the sensing antenna arrays after being reflected back from scattering of the wireless channel. However, since the wireless transceiver has knowledge of the transmitted signal (e.g., reference signals as well as data signals), it can take that into account and remove the influence of the transmitted signal for sensing. Such removal may be achieved, for example, by means of self-interference cancelation schemes or by joint processing schemes (e.g., joint Maximum-Likelihood detection). Alternatively or additionally, the wireless transceiver can place beamforming nulls in the transmit angles where the transmitted signal would eventually reach the sensing antenna elements. When performing channel sensing in communication transmission mode, the sensing and communication reception may, in some typical embodiments, be performed jointly by the entire plurality of transceiver antenna elements; without the reserving some antenna elements exclusively for sensing.

As illustrated by step 140, the method comprises—after having performed the channel sensing of step 120—operating the wireless transceiver based on a result of the performed channel sensing.

Operating the wireless transceiver based on the result of the performed channel sensing may, for example, comprise to stop or continue an ongoing transmission in communication transmission mode of the wireless transceiver, as illustrated by optional sub-step 142, when the performed channel sensing detects an interfering signal.

For example, when the interfering signal is detected to originate from the communication network of the wireless transceiver and an attempt to decode the interfering signal succeeds, it may be determined to continue the ongoing transmission. Alternatively or additionally, when the interfering signal is detected to originate from the communication network of the wireless transceiver and an attempt to decode the interfering signal fails, it may be determined to stop the ongoing transmission. Yet alternatively or additionally, it may be determined to stop the ongoing transmission when the interfering signal is detected to originate from a different communication network.

Thus, some different options are presented herein on how the wireless transceiver may handle detection of a problematic situation (e.g., interference from an interfering transceiver, for example, due to the hidden node problem elaborated on later herein) by sensing using the first set of transceiver antenna arrays.

For example, if the interfering transceiver is operating in the same communication network as the wireless transceiver, the wireless transceiver may attempt to decode what the interfering transceiver transmitted. If decoding is successful, the wireless transceiver may resolve the collision based on the decoding. Further, when the interfering transceiver stops its transmission, the wireless transceiver can inform the interfering transceiver regarding when future transmissions of the wireless transceiver will occur so that the interfering transceiver may defer from transmission during those instances.

Alternatively or additionally, the wireless transceiver may handle detection of the above problematic situation by one or more of: stopping its own transmission if the interfering transceiver is from a different communication network, stopping its own transmission if the interfering transceiver is from the same communication network and the collision cannot be resolved (e.g., the interfering transmission cannot be decoded by the wireless transceiver and/or an intended receiver cannot decode the transmission from the wireless transceiver), and continuing its own transmission if the interfering transceiver is from the same communication network and the collision can be resolved (e.g., the interfering transmission can be decoded by the wireless transceiver and/or the intended receiver can decode the transmission from the wireless transceiver).

When the channel sensing is directional channel sensing performed in one, two, or more direction(s), operating the wireless transceiver based on the result of the performed channel sensing may comprise selecting direction for an upcoming communication opportunity in communication transmission and/or reception modes of the wireless transceiver, as illustrated by optional sub-step 144.

For example, operating the wireless transceiver according to sub-step 144 may comprise selecting whether or not to use the direction for an upcoming transmission or reception opportunity based on channel sensing in the direction (e.g., based on signals, such as interference, detected for the direction during the channel sensing). Additionally or alternatively to basing the selection of detected interference, one or more other criteria may be applied. For example, the selection of direction may be based on one or more of: interference, network statistics (e.g., NACK/ACK statistics), channel conditions (e.g., SIR), etc. In a particular example a direction may be selected when it has a good trade-off between low interference, favorable network statistics, and good instantaneous channel conditions between transmitter and receiver.

The above (sub-step 144) may be applied for a single direction or for two or more directions.

Application in a single direction may comprise selecting whether or not to use the direction for an upcoming transmission or reception opportunity based (only) on channel sensing in the direction. An example use case for selecting in relation to a single direction comprises a gNB performing sensing for one UE before sweeping the beam to another UE. Thus, the gNB only senses for the direction to a particular UE. This may, for example, be applicable if the gNB already succeeded to access the channel in N−1 directions and wishes to add another direction (e.g., for a time-critical application of an UE in this other direction) while having ongoing communication in the N−1 directions. Then, the gNB only needs to sense for the not yet successful direction.

When the channel sensing is directional channel sensing performed in two or more directions, operating the wireless transceiver based on the result of the performed channel sensing may comprise selecting one or more direction of the two or more directions for an upcoming communication opportunity in communication transmission and/or reception modes of the wireless transceiver.

For example, operating the wireless transceiver according to sub-step 144 may comprise selecting a direction of the two or more directions for an upcoming transmission or reception opportunity based on channel sensing in the direction (e.g., based on signals, such as interference, detected for the directions during the channel sensing). For example, a direction may be selected for which the channel sensing detected less interference than the channel sensing of at least one of the non-selected directions (e.g., a direction with clear channel detection may be selected and/or the direction for which the channel sensing detected the least interference). Additionally or alternatively to basing the selection of detected interference, one or more other criteria may be applied as mentioned before. For example, the selection of direction may be based on one or more of: interference, network statistics (e.g., NACK/ACK statistics), channel conditions (e.g., SIR), etc. In a particular example a direction may be selected when it has a good trade-off between low interference, favorable network statistics, and good instantaneous channel conditions between transmitter and receiver.

Alternatively or additionally, operating the wireless transceiver according to sub-step 144 may comprise selecting more than one (e.g., two or more) directions of the two or more directions for an upcoming transmission or reception opportunity based on channel sensing in the direction.

Thus, the sensing operation of step 120 may be used to scan one or more directions to determine which direction(s) are suitable for the upcoming transmission and/or reception once the current communication is finalized.

Such an approach may be termed predictive sensing. With predictive sensing, a goal is to find a direction which is suitable for the next transmission or reception once the current transmission is finalized; additionally or alternatively to any goal of detecting problematic situations (e.g., relating to the hidden node problem).

In an example of predictive sensing, an access node (compare with 301 of FIG. 3) is in communication with (e.g., receiving data from) a user device UD1 (compare with 310 of FIG. 3) and has buffered data for transmission to two user devices UD2, UD3 (compare with 320, 330 of FIG. 3) located in spatially separable directions. While receiving the data from UD1 (compare with step 130 of FIG. 1), the access node senses the interference level in the directions of UD2 and UD3 (compare with step 120 of FIG. 1) to determine the respective interference levels. If, for example, the interference level is high in the direction of UD2 and low in the direction of UD3, the access node may—after finalizing the reception from UD1—perform a directional LBT procedure in the direction towards UD3 since the probability that this will be successful is higher than if a directional LBT procedure in the direction towards UD2 would have been performed (compare with sub-step 144 of FIG. 1). By application of predictive sensing, the probability that the access node will find a free channel is increased, and thereby the total time that the access node can access the channel will increase. Thus, predictive sensing may be applied for scheduling downlink transmissions.

The application of predictive sensing is equally applicable for scheduling uplink transmissions. For example, an access node is in communication with (e.g., receiving data from) a user device UD1 and knows that two user devices UD2, UD3 located in spatially separable directions have buffered data for transmission to the access node. While receiving the data from UD1, the access node senses the interference level in the directions of UD2 and UD3 to determine the respective interference levels. If, for example, the interference level is high in the direction of UD2 and low in the direction of UD3, the access node may—after finalizing the reception from UD1—schedule UD3 for uplink transmission. If UD3 needs to perform a (possibly short) LBT procedure before transmitting, the probability that this will be successful (i.e., that UD3 will be able to transmit) is higher than if UD2 performed an LBT procedure. Furthermore, even if UD2 would be able to transmit if scheduled, the interference caused by such transmission is likely to do more harm than a transmission by UD3, since the interference level was high in the direction of UE2 (indicating that some other transmission(s) are probably ongoing in the vicinity of UD2).

Typically, predictive sensing while communicating is easier to perform when the sensing device is receiving data rather than transmitting data. Thus, for uplink communication, the sensing of the access node may preferably be performed while receiving uplink data. For downlink communication, the sensing of the access node may preferably be performed while receiving ACK/NACK for downlink data.

As illustrated in optional sub-step 146, operating the wireless transceiver based on the result of the performed channel sensing may comprise providing (implicitly or explicitly; e.g., by transmitting)—to one or more other wireless transceivers and/or to a channel sensing statistics server—a channel sensing report including the result. Such channel sensing report may be used to build channel sensing statistics and/or to schedule further communication (e.g., timing and/or beam direction).

An example relating to optional sub-step 146 is when a user device (or a plurality of user devices) participate in the sensing procedure for the communication network. If a user device is equipped with multiple antenna elements (e.g., an antenna array), a set of the antenna elements can be configured for sensing in any of the suitable manners otherwise described herein. The user device may (e.g., sporadically) send collected statistics from performed sensing measurements to an access node of the network.

For example, if an access node is transmitting to a user device and the user device receives the transmission from a first angle, then the user device can steer its sensing towards another, preferentially orthogonal, second angle. The second angle should preferably be such that the transmission from the access node is received with little or no energy in the second angle. If the combined signal strength of signals received in the second such angle is higher than a threshold value (which can be signaled from the access node), that may be interpreted as there being a parallel transmission taking place—which may be due to hidden node problems.

The access node may (e.g., sporadically) send control signals to configure the sensing parameters of user device(s). Such control signaling may, for example, be implemented in new radio (NR) based access to unlicensed spectrum (NR-U) by adding a few extra downlink control information (DCI) bits. Alternatively, the network may allow the user device(s) to configure themselves to collect sensing statistics and report the statistics to the access node. This option may reduce the signaling overhead.

It should be noted that optional sub-steps 142, 144, 146 may be seen as alternatives that may be used singly or in any suitable combination.

Although not shown in FIG. 1, the method may be repeatedly performed. Thus, the method may return to step 110 after completion of step 140 according to some embodiments. The repetition of the method may be at regular time intervals and/or may be event based. For example, the method may be repeated responsive to a change of operation mode of the wireless transceiver. Example operation modes may comprise one or more of a non-communication mode (e.g., an idle mode or similar), a transmission communication mode, and a reception communication mode.

According to some embodiments, the method 100 is applied only after the wireless transceiver has gained access to the channel via a default channel sensing process (e.g., LBT, CCA, or CSMA/CA). The default sensing process may, for example, utilize the entire plurality of transceiver antenna arrays; or a suitable subset thereof. Hence, in such embodiments, the channel sensing of step 120 is not primarily for gaining channel access, but is rather for detecting interference, or similar problematic situations.

US20150016309A1 describes a full-duplex wireless device sensing the medium during transmission by itself and selectively continues the transmission when a signal is sensed on the medium. However, in US20150016309A1, there is an antenna specifically configured for reception and one antenna specifically configured for transmission, which teaches away from dynamic allocation. An antenna specifically configured for reception and one antenna specifically configured for transmission cannot be seen as an example of a plurality of transceiver antenna elements. Furthermore, US20150016309A1 mentions that the transmit antenna and receive antenna of a full-duplex wireless device can be configured to be spatially isolated from each other, which makes dynamic assignment of antenna elements impossible.

As mentioned before, FIG. 2 schematically illustrates an example antenna array 200 comprising a plurality of antenna elements 201, 202, 203, 204, 205, 206 in relation to three example assignment scenarios; scenario (a) which may, for example, be applicable in a communication transmission mode of the wireless transceiver, scenario (b) which may, for example, be applicable in a non-communication mode of the wireless transceiver, and scenario (c) which may, for example, be applicable in a communication reception mode of the wireless transceiver.

The illustrations of FIG. 2 may be seen as examples of the dynamic assignment of step 110 illustrated in FIG. 1, wherein the plurality of antenna elements 201, 202, 203, 204, 205, 206 are assigned to a first set 210a, 210b, 210c allocated for channel sensing and a second set 220a, 220b, 220c allocated for communication.

In scenario (a), which may be applicable in a communication transmission mode of the wireless transceiver, the first set 210a comprises a first set 201, 202 of the transceiver antenna elements and the second set 220a comprises a second set 203, 204, 205, 206 of the transceiver antenna elements. In this example, the first and second sets are non-overlapping (which is suitable for communication transmission mode since the first set is for sensing—antenna elements in reception mode—and the second set is for communication—antenna elements in transmission mode) and together comprise the plurality of transceiver antenna elements. In other situations, the first and second sets may together comprise less than the plurality of transceiver antenna elements.

Typically, the cardinalities of the first and second sets 210a, 220a may be varying, e.g., depending on whether omnidirectional or directional channel sensing is applied and/or depending on how narrow beam is for directional beamforming. This variable cardinality is illustrated at 250 in FIG. 2.

As mentioned before, and alternatively or additionally to the cardinalities being variable, it may be varied which transceiver antenna elements are comprised in which one of the first and second sets (e.g., which transceiver antenna elements that the first set consists of and which transceiver antenna elements the second set consists of). For example, at a first occasion, the first set may consist of two transceiver antenna elements 201, 206, and, at a second occasion, the first set may comprise two other transceiver antenna elements 204, 205.

For example, an access node (e.g., a gNB) AN1 may be equipped with an antenna array with M antenna elements (i.e., the plurality equals M). Then, a sub-array 210a of m antenna elements may be assigned to operate in transmit (or receive) mode for scenario (a) and a sub-array 220a of (M−m) antenna elements may be assigned to operate in sensing (i.e., listening/reception) mode. Thus, the sub-array 210a of m antenna elements can be used to transmit to (or receive from) one or more user devices (e.g., UEs) UD1, UD2 using beamforming; while the sub-array 220a of (M−m) antenna elements is used for directional channel sensing to listen for interference in one or more directions (e.g., in a direction towards a user device UD3).

The choice of m may, for example, depend on past and/or current network states, and/or the history of sensing measurements in the network.

In a typical approach, the choice of m may reflect a desired trade-off between benefits (e.g., array gain and spatial reuse) of communication using beamforming and drawbacks (e.g., wasted power usage and intra/inter-cell interference) of unexpected interference from interfering transceivers; which may be due to the hidden node problem elaborated on later herein.

For example, if it is determined that the communication network currently has a very low probability of encountering the hidden node problem, then the wireless transceiver may operate with all its antenna elements in communication mode, i.e., m=M. However, if it is determined that the communication network currently has a quite high probability of encountering the hidden node problem, it may be beneficial for the overall network performance if the wireless transceiver assigns some of its antennas for sensing, i.e., m<M.

Changing the dimensionality of the sensing sub-array can be performed gradually in time. For example, the wireless transceiver can start by assigning an initial number $N_{init}$ of sensing antenna elements, i.e., (M−n)=$N_{init}$, and then—depending on the outcome of the channel sensing—increase or decrease (M−n) gradually by δ antennas, where δ is a positive real integer. Typically, δ may be relatively small compared to (M−n). For example, the positive real integer may be chosen from the set $$\delta \in \left\{ \text{ceil}\left(\frac{M-n}{20}\right), \text{ceil}\left(\frac{m-M}{10}\right), \text{ceil}\left(\frac{M-n}{5}\right) \right\},$$

where ceil(x) is the ceiling function, which outputs the smallest integer that is not smaller than x.

In scenario (b), which may be applicable in a non-communication mode of the wireless transceiver, the first set 210b comprises the entire plurality of transceiver antenna elements and the second set 220b is empty, which is suitable for non-communication mode since the second set is for communication which is not applicable in a non-communication mode. In other situations, the first set may comprise less than the plurality of transceiver antenna elements, while the second set is empty.

In scenario (c), which may be applicable in a communication reception mode of the wireless transceiver, the first set 210c comprises the entire plurality of transceiver antenna elements and the second set 220c also comprises the entire plurality of transceiver antenna elements. Thus, the first and second sets are fully overlapping in this example, which is suitable for communication reception mode since the first set is for sensing—antenna elements in reception mode—and the second set is for communication—antenna elements in reception mode. In other situations, the first and second sets may be partly overlapping, or non-overlapping (similarly to scenario (a)). Furthermore, the first and second sets together comprise the plurality of transceiver antenna elements in this example, while the first and second sets may together comprise less than the plurality of transceiver antenna elements in other situations.

Figure 3:
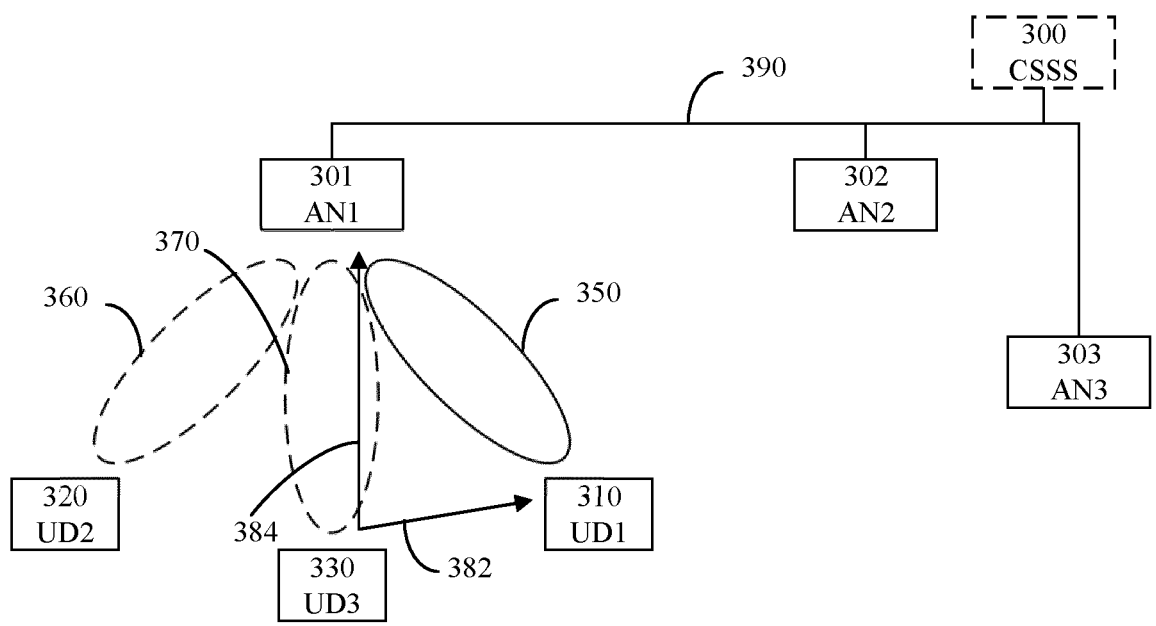
FIG. 3 is a schematic drawing illustrating an example communication scenario according to some embodiments.

FIG. 3 schematically illustrates an example communication scenario where some embodiments may be applicable. The scenario comprises a plurality of access nodes (AN1, AN2, AN3) 301, 302, 303 of a communication network. The communication network may also comprise a channel sense statistics server (CSSS) 300. The entities of the communication network are operatively connected to each other as illustrated by the schematic connection 390 in FIG. 3. A plurality of user devices (UD1, UD2, UD3) 310, 320, 330 are operating in association with the communication network, and are served by the access node 301 using directional beams 350, 360, 370 respectively.

As mentioned before, if user device 330 does not register ongoing communication from the access node 301 to the used device 310 over beam 350 when performing channel sensing, it may start transmission that may cause collision/interference, e.g., at the access node 301 as illustrated by 384 and/or at the user device 310 as illustrated by 382 and/or at any of the other access nodes 302, 303 and/or at any of the other user devices 320.

Some embodiments may provide mitigation of this problem by application (e.g., in access node 301) of the method described in connection with FIG. 1 and/or by incorporation (e.g., in access node 301) of the apparatus that will be described in connection with FIG. 4.

Figure 4:
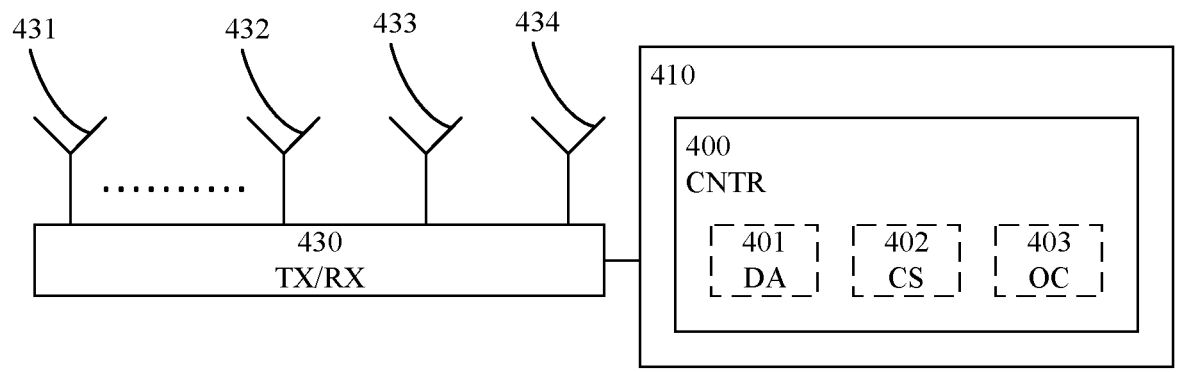
FIG. 4 is a schematic block diagram illustrating an example apparatus according to some embodiments.

FIG. 4 schematically illustrates an example apparatus 410 according to some embodiments. For example, the apparatus 410 may be configured to cause performance of (e.g., may be configured to perform) one or more method steps as described in connection with FIG. 1.

The apparatus 410 is for a wireless transceiver comprising a plurality of transceiver antenna elements and configured to operate in a communication network. The apparatus may be comprisable (e.g., comprised) in a wireless transceiver such as, for example, an access node or a user device.

The apparatus comprises a controller (CNTR; e.g., controlling circuitry or a controlling module) 400 configured to cause dynamic assignment, from the plurality of transceiver antenna elements 431, 432, 433, 434, of a first set of transceiver antenna elements allocated for channel sensing and a second set of transceiver antenna elements allocated for communication (compare with step 110 of FIG. 1).

To this end, the controller may comprise, or be otherwise associated with, a dynamic assigner (DA; e.g., dynamic assignment circuitry or a dynamic assignment module) 401. The dynamic assigner may be configured to dynamically assign, from the plurality of transceiver antenna elements, the first set of transceiver antenna elements allocated for channel sensing and the second set of transceiver antenna elements allocated for communication.

Dynamic assignment may be based on one or more of: a communication mode of the wireless transceiver, network statistics collected by the wireless transceiver, network statistics collected by one or more other wireless transceivers, one or more previous results of channel sensing performed by the wireless transceiver, and one or more previous results of channel sensing performed by one or more other wireless transceivers.

To this end, the controlling circuitry may be configured to acquire channel sensing statistics from and/or to provide channel sensing results to a channel sensing statistics server.

The controller 400 is also configured to cause performance of channel sensing using the first set of transceiver antenna elements (compare with step 120 of FIG. 1).

To this end, the controller may comprise, or be otherwise associated with, a channel sensor CS; e.g., channel sensing circuitry or a channel sensing module) 402. The channel sensor may be configured to perform channel sensing using the first set of transceiver antenna elements; typically in cooperation with a receiver (e.g., receiving circuitry or a receiving module), illustrated in FIG. 4 as part of a transceiver (TX/RX) 430, operably connectable (e.g. connected) to the controller 400.

The controller 400 is also configured to cause operation of the wireless transceiver based on a result of the performed channel sensing (compare with step 140 of FIG. 1).

To this end, the controller may comprise, or be otherwise associated with, an operation controller (OC; e.g., operation controlling circuitry or an operation controlling module) 403. The operation controller may be configured to operate the wireless transceiver based on the result of the performed channel sensing; typically in cooperation with a receiver (e.g., receiver circuitry or a receiver module) and/or a transmitter (e.g., transmitter circuitry or a transmitter module), both illustrated in FIG. 4 as part of a transceiver (TX/RX) 430, operably connectable (e.g. connected) to the controller 400.

In some embodiments, the controller 400 may be configured to cause the channel sensing to be performed while communication is performed using the second set of transceiver antenna elements in communication transmission and/or reception modes of the wireless transceiver (compare with step 130 of FIG. 1).

The problem with not hearing an ongoing first transmission by a first transceiver when the channel is sensed by a second transceiver (which leads to that the channel is considered free and that a second transmission may be initiated by the second transceiver, which second transmission, in fact, interferes with the first transmission) is sometimes referred to as the hidden node problem.

Some embodiments, mitigates the hidden node problem via introduction of a sensing sub-array (the first set) for an antenna array of the first transceiver. Typically the sensing sub-array enables channel sensing while transmission and/or reception is also performed at the first transceiver.

Mitigation may, for example, comprise detection at the first transceiver of the second transmission and performing mitigation actions in response thereto. As exemplified above, such mitigation actions may comprise one or more of: stopping the ongoing first transmission, adjusting (increasing or decreasing) a transmit power for the first transmission, resolving the collision between the first and second transmissions, etc.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a user device) or a network node (e.g., an access node).

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 5:
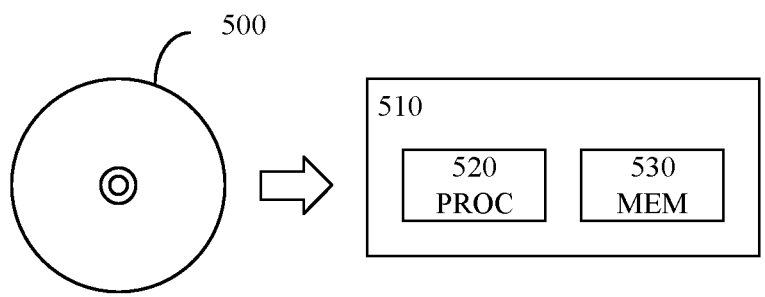
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a wireless communication device or a network node 510. When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIG. 1 or otherwise described herein.

Figure 6:
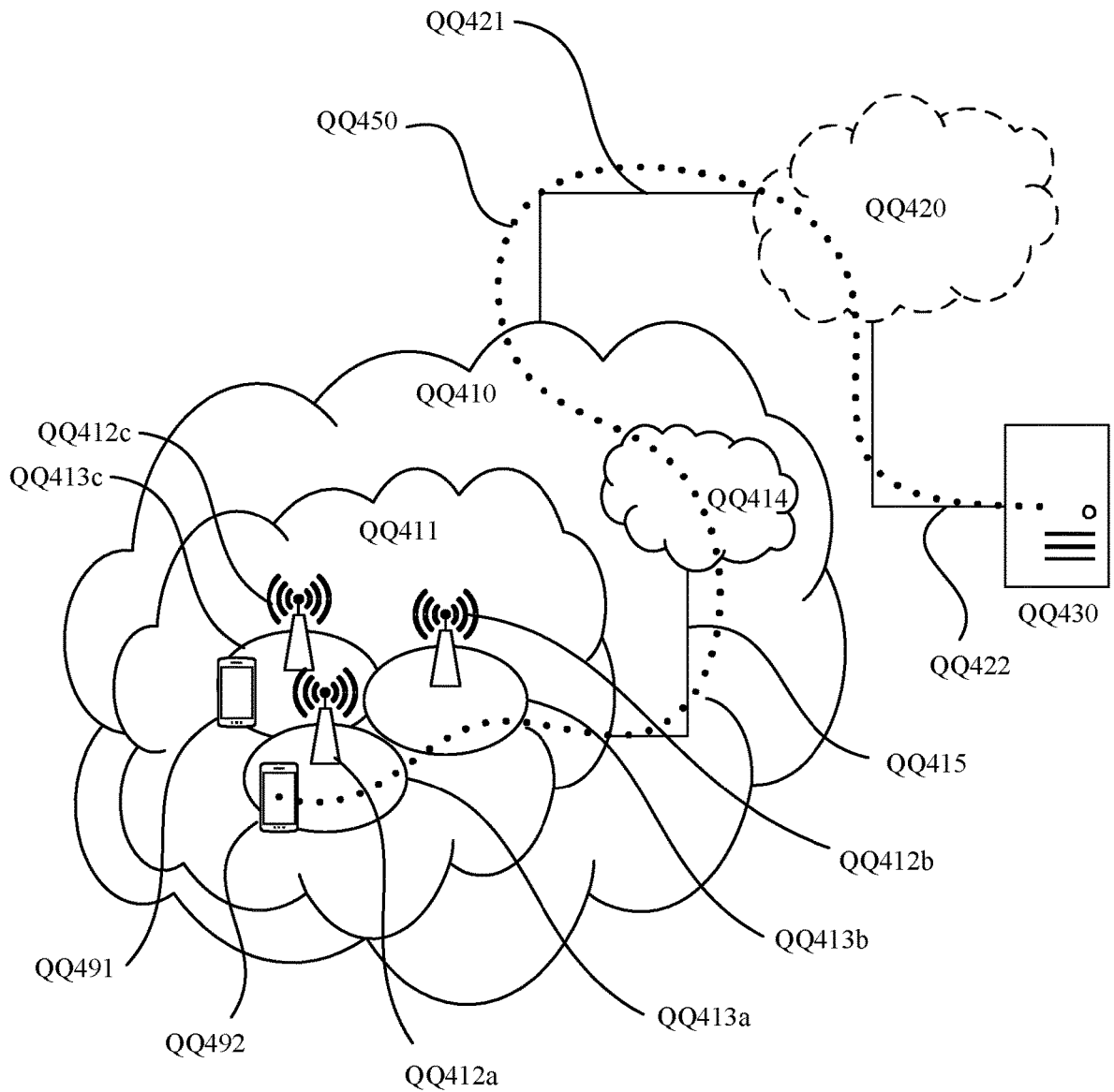
FIG. 6 illustrates a telecommunication network connected via an intermediate network to a host computer in accordance with some embodiments.

With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection. Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
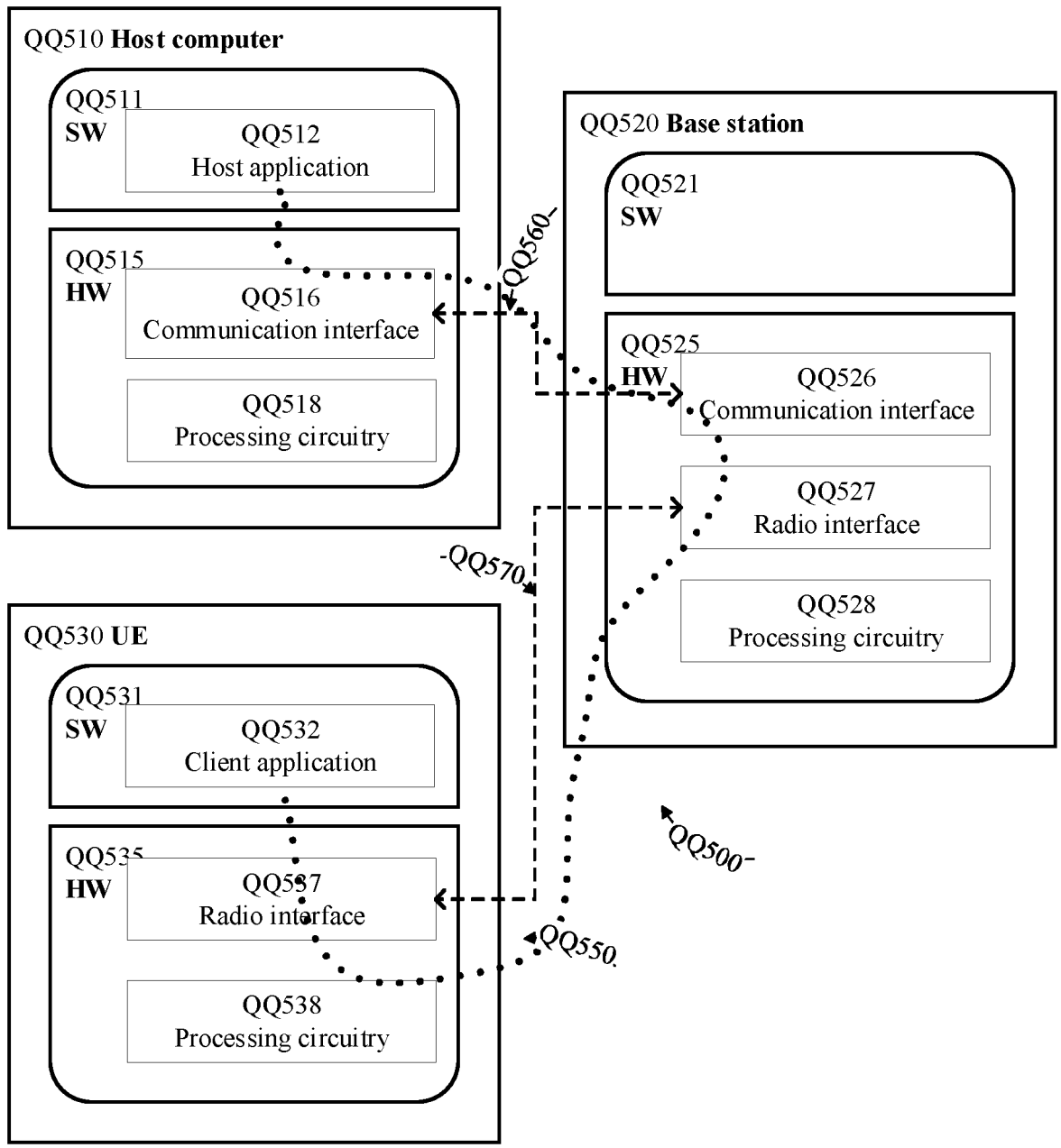
FIG. 7 illustrates a host computer communicating via a base station with a user equipment over a partially wireless connection in accordance with some embodiments.

It is noted that host computer QQ510, base station QQ520 and UE QQ530 illustrated in FIG. 7 may be similar or identical to host computer QQ430, one of base stations QQ412a, QQ412b, QQ412c and one of UEs QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the channel sensing and thereby provide benefits such as better resolving of collisions.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
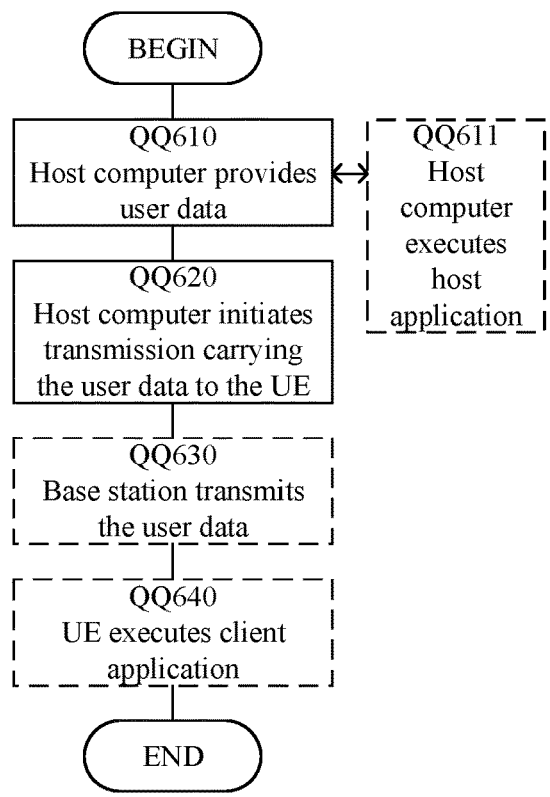
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 9:
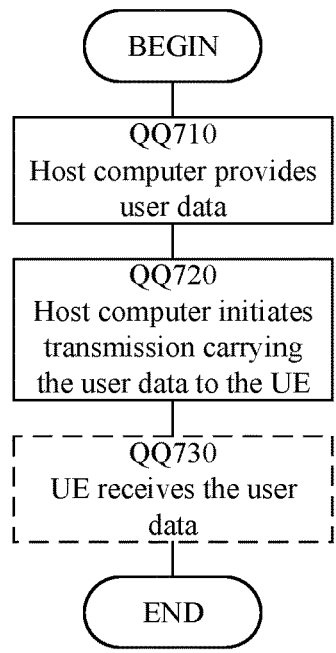
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 10:
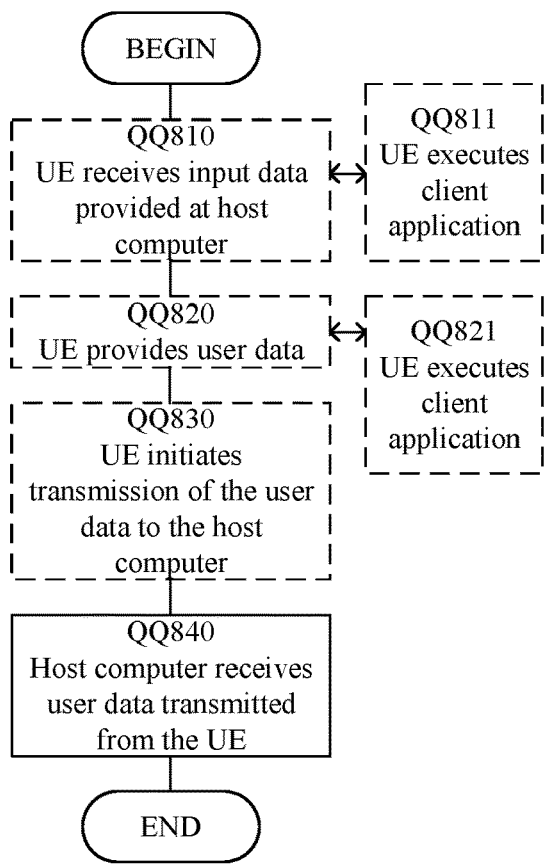
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 11:
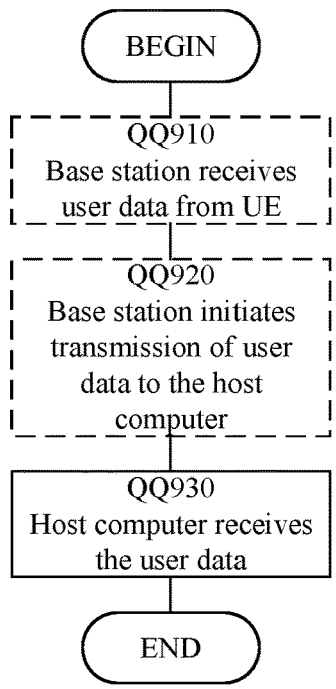
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method for channel sensing performed by a wireless device comprising a plurality of transceiver antenna elements and configured to operate in a communication network, the method comprising:
  dynamically assigning (110), from the plurality of transceiver antenna elements, a first set (210a-c) of transceiver antenna elements allocated for channel sensing and a second set (220a-c) of transceiver antenna elements allocated for communication;
  performing channel sensing (120) using the first set of transceiver antenna elements; and
  operating (140) the wireless transceiver based on a result of the performed channel sensing.

A2. The method of any of the previous embodiments in Group A, further comprising:
  providing user data; and
  forwarding the user data to a host computer via transmission to a base station.

Group B Embodiments

B1. A method for channel sensing performed by a base station comprising a plurality of transceiver antenna elements and configured to operate in a communication network, the method comprising:
  dynamically assigning (110), from the plurality of transceiver antenna elements, a first set (210a-c) of transceiver antenna elements allocated for channel sensing and a second set (220a-c) of transceiver antenna elements allocated for communication;
  performing channel sensing (120) using the first set of transceiver antenna elements; and
  operating (140) the wireless transceiver based on a result of the performed channel sensing.

B2. The method of any of the previous embodiments in Group B, further comprising:
  obtaining user data; and
  forwarding the user data to a host computer or a wireless device.

Group C Embodiments

C1. A wireless device for channel sensing, the wireless device comprising a plurality of transceiver antenna elements and being configured to operate in a communication network, the wireless device further comprising:
  processing circuitry configured to perform any of the steps of any of the Group A embodiments; and
  power supply circuitry configured to supply power to the wireless device.

C2. A base station for channel sensing, the base station comprising a plurality of transceiver antenna elements and configured to operate in a communication network, the base station further comprising:
  processing circuitry configured to perform any of the steps of any of the Group B embodiments;
  power supply circuitry configured to supply power to the base station.

C3. A user equipment (UE) for channel sensing, the UE comprising a plurality of transceiver antenna elements and being configured to operate in a communication network, the UE further comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
- at the host computer, providing user data; and
- at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
- communication interface configured to receive user data originating from a transmission from a user equipment (UE) to a base station,
- wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
- the processing circuitry of the host computer is configured to execute a host application; and
- the UE's processing circuitry is configured to execute a client application associated with the host application, thereby providing the user data.

D18. The communication system of any of embodiments D14 through D17, wherein:
- the processing circuitry of the host computer is configured to execute a host application, thereby providing request data; and
- the UE's processing circuitry is configured to execute a client application associated with the host application, thereby providing the user data in response to the request data.

D19. A method implemented in a communication system including a host computer, a base station and a user equipment (UE), the method comprising:
- at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
- at the UE, executing a client application, thereby providing the user data to be transmitted; and
- at the host computer, executing a host application associated with the client application.

D22. The method of any of embodiments D19 through D21, further comprising:
- at the UE, executing a client application; and
- at the UE, receiving input data to the client application, the input data being provided at the host computer by executing a host application associated with the client application,
- wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
- the processing circuitry of the host computer is configured to execute a host application;
- the UE is configured to execute a client application associated with the host application, thereby providing the user data to be received by the host computer.

D28. A method implemented in a communication system including a host computer, a base station and a user equipment (UE), the method comprising:
- at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
- at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method of controlling a wireless transceiver; the wireless transceiver comprising a plurality N of transceiver antenna elements and configured to operate in a communication network; the method comprising:
- dynamically assigning, from the plurality N of transceiver antenna elements, a first set of transceiver antenna elements allocated for channel sensing and a second set of transceiver antenna elements allocated for communication;
- performing channel sensing using the first set of transceiver antenna elements; and
- operating the wireless transceiver based on a result of the performed channel sensing;

wherein dynamically assigning comprises:
  in a non-communication mode of the wireless transceiver, letting the first set comprise all of the transceiver antenna elements and letting the second set be empty;
  in a communication transmission mode of the wireless transceiver, letting the first set comprise a first subset of the transceiver antenna elements and letting the second set comprise a second subset of the transceiver antenna elements, wherein the first and second subsets are non-overlapping; and
  in a communication reception mode of the wireless transceiver, letting the first set comprise a third subset of the transceiver antenna elements and letting the second set comprise a fourth subset of the transceiver antenna elements, wherein the third and fourth subsets are overlapping;
wherein the operating the wireless transceiver based on the result of the performed channel sensing comprises, when the performed channel sensing detects an interfering signal in communication transmission mode of the wireless transceiver:
  determining to continue an ongoing transmission when the interfering signal is detected to originate from the communication network of the wireless transceiver and an attempt to decode the interfering signal succeeds;
  determining to stop the ongoing transmission when the interfering signal is detected to originate from the communication network of the wireless transceiver and an attempt to decode the interfering signal fails; and
  determining to stop the ongoing transmission when the interfering signal is detected to originate from a different communication network;
wherein the channel sensing is directional channel sensing performed in two or more directions; and
wherein the operating the wireless transceiver based on the result of the performed channel sensing comprises, in communication transmission and/or reception modes of the wireless transceiver, selecting one or more direction of the two or more directions for an upcoming transmission or reception opportunity; wherein the channel sensing of the selected one or more direction detected less interference or lower received signal strength than the channel sensing of at least one of a non-selected direction.

2. The method of claim 1, wherein selection of which transceiver antenna elements belongs to the first and second sets is variable.

3. The method of claim 1:
wherein a cardinality of the second set is variable between zero and N, and can take at least two values which differ from zero and N;
wherein the cardinality of the first set is variable between one and N, and can take at least one value which differs from N.

4. The method of claim 1, wherein the dynamically assigning comprises determining cardinalities of the first and second sets based on:
  a communication mode of the wireless transceiver;
  network statistics collected by the wireless transceiver;
  network statistics collected by one or more other wireless transceivers;
  one or more previous results of channel sensing performed by the wireless transceiver; and/or
  one or more previous results of channel sensing performed by one or more other wireless transceivers.

5. The method of claim 1, wherein a size of the first subset is determined based on one or more previous results of channel sensing performed by the wireless transceiver and/or by one or more other wireless transceivers.

6. The method of claim 1, wherein the channel sensing is performed while communication is performed using the second set of transceiver antenna elements in communication transmission and/or reception modes of the wireless transceiver.

7. The method of claim 1:
wherein the channel sensing is directional channel sensing performed in a direction;
wherein the operating the wireless transceiver based on the result of the performed channel sensing comprises, in communication transmission and/or reception modes of the wireless transceiver, selecting whether or not to use the direction for an upcoming transmission or reception opportunity based on signal detection for the direction during the channel sensing.

8. An apparatus for a wireless transceiver; the wireless transceiver comprising a plurality N of transceiver antenna elements and configured to operate in a communication network; the apparatus comprising control processing circuitry configured to cause:
  dynamic assignment, from the plurality N of transceiver antenna elements, of a first set of transceiver antenna elements allocated for channel sensing and a second set of transceiver antenna elements allocated for communication;
  performance of channel sensing using the first set of transceiver antenna elements; and
  operation of the wireless transceiver based on a result of the performed channel sensing;
wherein dynamically assigning comprises:
  in a non-communication mode of the wireless transceiver, letting the first set comprise all of the transceiver antenna elements and letting the second set be empty;
  in a communication transmission mode of the wireless transceiver, letting the first set comprise a first subset of the transceiver antenna elements and letting the second set comprise a second subset of the transceiver antenna elements,
    wherein the first and second subsets are non-overlapping; and
  in a communication reception mode of the wireless transceiver, letting the first set comprise a third subset of the transceiver antenna elements and letting the second set comprise a fourth subset of the transceiver antenna elements, wherein the third and fourth subsets are overlapping;
wherein the control processing circuitry is configured to cause the operation of the wireless transceiver based on the result of the performed channel sensing by causing, when the performed channel sensing detects an interfering signal in communication transmission mode of the wireless transceiver:
  continuation of an ongoing transmission when the interfering signal is detected to originate from the communication network of the wireless transceiver and an attempt to decode the interfering signal succeeds;
  stoppage of the ongoing transmission when the interfering signal is detected to originate from the communication network of the wireless transceiver and an attempt to decode the interfering signal fails; and stoppage of the ongoing transmission when the interfering signal is detected to originate from a different communication network;

wherein the channel sensing is directional channel sensing performed in two or more directions; and wherein the operating the wireless transceiver based on the result of the performed channel sensing comprises, in communication transmission and/or reception modes of the wireless transceiver, selecting one or more direction of the two or more directions for an upcoming transmission or reception opportunity; wherein the channel sensing of the selected one or more direction detected less interference or lower received signal strength than the channel sensing of at least one of a non-selected direction.

9. The apparatus of claim 8, wherein a selection of which transceiver antenna elements belongs to the first and second sets is variable.

10. The apparatus of claim 8, wherein the control processing circuitry is configured to cause dynamic assignment of the first and second sets of transceiver antenna elements by causing determination of cardinalities of the first and second sets based on:
a communication mode of the wireless transceiver;
network statistics collected by the wireless transceiver;
network statistics collected by one or more other wireless transceivers;
one or more previous results of channel sensing performed by the wireless transceiver; and/or
one or more previous results of channel sensing performed by one or more other wireless transceivers.

11. The apparatus of claim 10, wherein the control processing circuitry is configured to cause a size of the first subset to be determined based on one or more previous results of channel sensing performed by the wireless transceiver and/or by one or more other wireless transceivers.

12. The apparatus of claim 8, wherein the control processing circuitry is configured to cause the channel sensing to be performed while communication is performed using the second set of transceiver antenna elements in communication transmission and/or reception modes of the wireless transceiver.

13. The apparatus of claim 8: wherein the channel sensing is directional channel sensing performed in a direction;
wherein the control processing circuitry is configured to cause the operation of the wireless transceiver based on the result of the performed channel sensing by causing, in communication transmission and/or reception modes of the wireless transceiver, selection of whether or not to use the direction for an upcoming transmission or reception opportunity based on signal detection for the direction during the channel sensing.

14. The apparatus of claim 8:
wherein the channel sensing is directional channel sensing performed in two or more directions;
wherein the control processing circuitry is configured to cause the operation of the wireless transceiver based on the result of the performed channel sensing by causing, in communication transmission and/or reception modes of the wireless transceiver, selection of one or more direction of the two or more directions for an upcoming transmission or reception opportunity; wherein the channel sensing of the selected one or more direction detected less interference or lower received signal strength than the channel sensing of at least one of a non-selected direction.

15. A wireless transceiver configured to operate in a communication network, the wireless transceiver comprising:
a plurality N of transceiver antenna elements
control processing circuitry configured to cause:
dynamic assignment, from the plurality N of transceiver antenna elements, of a first set of transceiver antenna elements allocated for channel sensing and a second set of transceiver antenna elements allocated for communication;
performance of channel sensing using the first set of transceiver antenna elements; and
operation of the wireless transceiver based on a result of the performed channel sensing wherein dynamically assigning comprises:
in a non-communication mode of the wireless transceiver, letting the first set comprise all of the transceiver antenna elements and letting the second set be empty;
in a communication transmission mode of the wireless transceiver, letting the first set comprise a first subset of the transceiver antenna elements and letting the second set comprise a second subset of the transceiver antenna elements, wherein the first and second subsets are non-overlapping; and
in a communication reception mode of the wireless transceiver, letting the first set comprise a third subset of the transceiver antenna elements and letting the second set comprise a fourth subset of the transceiver antenna elements, wherein the third and fourth subsets are overlapping;
wherein the control processing circuitry is configured to cause the operation of the wireless transceiver based on the result of the performed channel sensing by causing, when the performed channel sensing detects an interfering signal in communication transmission mode of the wireless transceiver:
continuation of an ongoing transmission when the interfering signal is detected to originate from the communication network of the wireless transceiver and an attempt to decode the interfering signal succeeds;
stoppage of the ongoing transmission when the interfering signal is detected to originate from the communication network of the wireless transceiver and an attempt to decode the interfering signal fails; and
stoppage of the ongoing transmission when the interfering signal is detected to originate from a different communication network;
wherein the channel sensing is directional channel sensing performed in two or more directions; and
wherein the operating the wireless transceiver based on the result of the performed channel sensing comprises, in communication transmission and/or reception modes of the wireless transceiver, selecting one or more direction of the two or more directions for an upcoming transmission or reception opportunity; wherein the channel sensing of the selected one or more direction detected less interference or lower received signal strength than the channel sensing of at least one of a non-selected direction.

* * * * *